United States Patent [19]

De Weck et al.

[11] Patent Number: 4,909,557

[45] Date of Patent: Mar. 20, 1990

[54] MOBILE COMPUTER CLEAN ROOM

[75] Inventors: Arnaud De Weck, 55 Avenue Jean Moulin, 75014 Paris; Xavier Guerin, Plaisance, 28120 Illiers-Combray, both of France

[73] Assignees: Arnaud De Weck, Paris; Xavier Guerin, Illiers-Combray, both of France

[21] Appl. No.: 55,799

[22] Filed: Jun. 1, 1987

[30] Foreign Application Priority Data

May 30, 1986 [FR] France .................... 86 07927

[51] Int. Cl.⁴ .............................................. B60P 3/00
[52] U.S. Cl. ........................................ 296/24.1; 296/26
[58] Field of Search ............... 296/24.1, 181, 26, 1.1, 296/172

[56] References Cited

U.S. PATENT DOCUMENTS

| | | | |
|---|---|---|---|
| 2,832,637 | 4/1958 | Decosse | 296/26 |
| 2,906,556 | 9/1959 | Cantele | 296/26 |
| 3,070,850 | 1/1963 | McClure, Sr. | 296/172 |
| 3,271,065 | 9/1966 | Scuris | 296/26 |
| 3,534,997 | 10/1970 | Mitchell, Jr. | 296/26 |
| 3,540,607 | 11/1970 | Mandel | 296/26 |
| 4,135,755 | 1/1979 | Steffens | 296/26 |
| 4,181,347 | 1/1980 | Clark | 296/24.1 |
| 4,712,822 | 12/1987 | Janos et al. | 296/24.1 |

*Primary Examiner*—Robert R. Song
*Attorney, Agent, or Firm*—Frishauf, Holtz, Goodman & Woodward

[57] ABSTRACT

A mobile computer clean room satisfying all the temperature, humidity, and filtration constraints of a traditional "clean room" features a first portion (A) equipped with power supply means including battery means (17) and an inverter (18), and environmental control means including air conditioning (19) and particle filtration means, and a second, expandable, environmentally-controlled computer-receiving portion (B), having a double floor (4), and operatively coupled to said first portion, and means (2) for rolling said first and second portions from place to place to serve as an emergency service computer in the event that the computer normally in service finds itself momentarily out of service after a physical destruction (fire, explosion, flood).

3 Claims, 1 Drawing Sheet

MOBILE COMPUTER CLEAN ROOM

BACKGROUND

The present invention relates generally to a new industrial product, namely, a vehicle of a type in itself generally known but including equipment which adapts it to render services that have never been proposed heretofore.

The vehicle thus equipped can be designated by the expression "mobile clean room", and it allows to put, at all moments and in all places, at the disposition of a user an enclosure appropriate for the immediate utilization of a computer.

It is known that the environment in which a computer is placed must respect the most severe constraints, specially concerning the temperature, humidity, and, the absence of all atmospheric pollution. Thus, for example, one can recall that for a computer of current model the air conditioning constraints for the location are the following: caloric dissipation—25 300 KCal:h.

Conditions to be kept in the ambiance of the room;

| Computer | Temperature | Humidity | Filtration |
| --- | --- | --- | --- |
| In Service | 22° C. ± 2° C. | 50% ± 5% | 90% of 3 microns |
| In Step | 15 to 32° C. | 40 to 70% | 90% of 3 microns |
| Gradient | 3° C./h | 5%/h | | duct of computer feeding: 27° C.

Moreover, such a facility must imperatively include a double floor in the full space, in which are lodged all the wiring and various conduits, especially those assuring the air conditioning. Such double floor should allow access to this space and be at the same time perfectly stable.

It is, in principle, foreseen in the enterprises using computers to keep permanently available a facility in which these contraints are respected, in such a manner as to be able to receive an emergency service computer in the event that the computer normally in service finds itself momentarily out of service after a physical destruction (fire, explosion, flood) or by reason of a geographical isolation, social movement or again during a period of change or of materials tests.

Such emergency service computer then allows an enterprise to pursue its activity in unperturbed normal conditions.

In fact, in the daily reality, these "clean rooms", which are therefore computer rooms without computers, rapidly are seen as unoccupied offices and they are diverted from their first function into storing desks or files so that they cease to be available for the moment where they become necessary and therefore they do not fulfill their role.

The present invention remedies this situation, in proposing a "mobile clean room" that is to say a vehicle equipped in such a manner as to constitute a facility satisfying all the constraints of a traditional "clean room" and it can be put at the disposal of occasional users on simple demand whatever would be the moment, the place where the need is manifested. The mobile clean room is then rented to the user in order to allow the emergency service required during the necessary period.

In practice, the carrying vehicle is by preference of the semi-trailer truck type of which the greater part of the trailer is conceived in such a manner as to be capable, when it stops, of deploying itself in a manner as to constitute the so-called facility while in the forward portion contains the equipment which satisfy the aforementioned constraints, to wit, an electrical battery, a sine-wave power inverter, a system of air conditioning, the control panel, and the like.

One first embodiment of such a trailer consist in setting up on the length of its two sides, longitudinal panels that fold the one over the other, in order to allow the displacements of the vehicle in respect of the usual congestion norms, which panels will be deployed while stationary. In order to form successively on each side a roof, a double floor and an exterior longitudinal barrier, the ensemble of each volume thus deployed rest at the time on jacks. The principle of such vehicles is used for example by traveling shops and certain camping house trailers.

According to a second embodiment, each of the two volumes in question constitutes a lateral gallery which lodges in the interior of the trailer during the displacements and telescopes to the exterior in order to double the volume of the trailer while stationary; such a type of variable volume vehicle actually equips for example the travelling libraries and the centers of blood transfusion and and the like.

Even if one were to conclude that the principle of the vehicle in these two embodiments is not new in itself, its application to the creation of "mobile clean rooms" by adaptation of its construction and its association with the appropriate technical means is entirely new.

Thus, the facility thus created resting, while stationary, over crutches presents the required stability. It includes the connection of lines to the exterior sources of energy. Its body is well understood to be isothermic and its equipment of air conditioning has the same effectiveness as it would have in a fixed location.

It includes the double false floor in order to receive the wiring of the computer. The facility, therefore, internally respects the specifications of a classic information storage room.

BRIEF FIGURE DESCRIPTION

DETAILED DESCRIPTION

Figure 1:
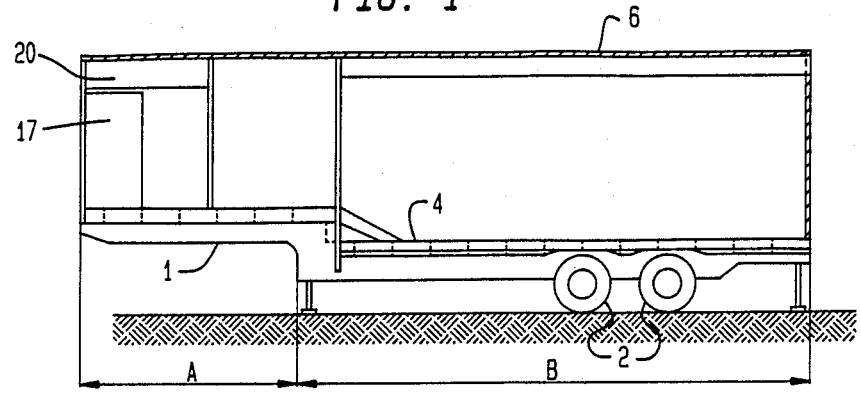
FIG. 1 is a sideview of a trailer transformable into a clean room in accordance with the invention.
Figure 2:
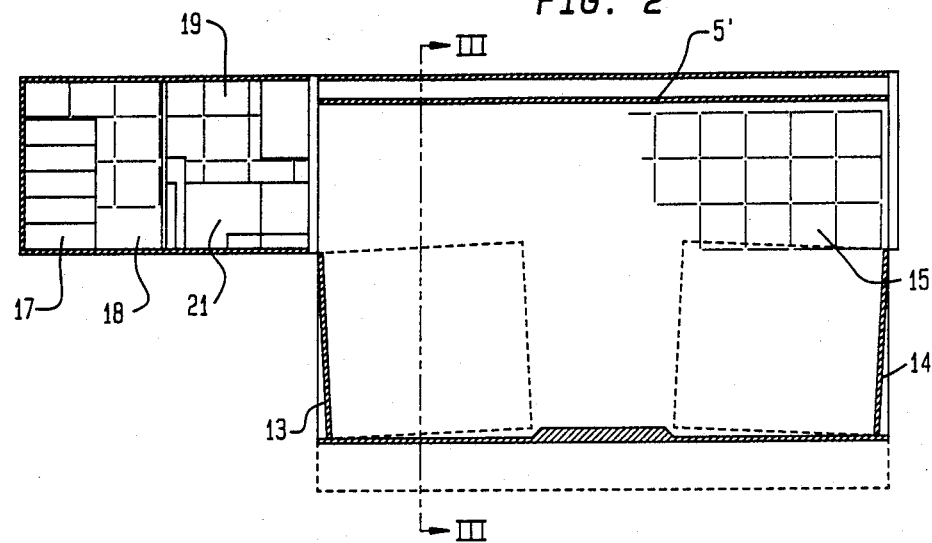
FIG. 2, is a view from the end of this trailer, in which one of the sides is folded and the other is deployed.

The figures illustrate a semi-trailer of the generally known type. It comprises a chassis having a forward portion A, adapted to hook onto the towing vehicle, and a rear portion B, which rolls on wheels 2.

According to the invention, portion B comprises a volume of base 3, formed by a double fixed floor 4, two longitudinal walls 5—5' and a roof 6. Between the floor 4 and the roof 6, on the one hand, an exterior panel fold on each side 7, articulated on the exterior edge 8 of the roof 6, on the other hand a double roof 9, articulated on the exterior edge 10 of the floor 4 and a division 11, articulated on the exterior edge 12 of the floor 9.

Figure 3:
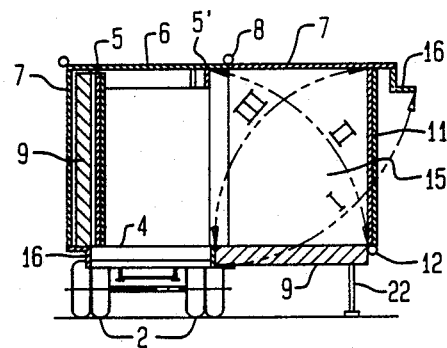
FIG. 3 is a vertical section along line III—III of FIG. 2.

The partitions in the extremes 13–14 complete the volume 15 thus formed in each side. As can be better seen in FIG. 3, this system of unfolding practically triples the volume 3 of the trailer base. It shall be noticed that the exterior edges 16 of the panel 7 form a corner which assures the closing of the folded panels above the wheels 2.

Furthermore the portion A which is not foldable contains all the installations annexed assuring the functioning of the computer which is received in the B portion:

Battery 17
Sine-wave inverter 18
Air Conditioner 19
Ventilator
Control Panel From the fact that the wiring connections and various conduits are located in the double floor 4 and 9, it shall be noticed that the lateral panels can be carried out in several removable modules in such a manner as to be able to place in communication two or several detachable units side by side, thus creating again more important volumes. Of course, the number of jacks 22, such as are necessary to assure the stability of the ensemble will be distributed under the out of line portions.

The advantages of such a "mobile clean room" are multiplied:

(a) For the user:
It pallates the inconvenience of diverting the obligatory normal use of the white room in the enterprise, which, in fact frees a location within the enterprise.

It will serve only in case of need, that is to say that the expenses of its maintenance will appear only in the emergency periods.

It is immediately available, very close to the habitual site as well as to the contrary in a distant place because of reasons of confidentiality.

Several trailers can be assembled in order to constitute rooms of different dimensions.

(b) And for the lender of the service, the passage from one user to another assures a practically continuous utilization of the material which besides can be programmed according to unforeseen needs or accidental users.

We claim:

1. A mobile computer clean room, comprising
   a first portion (A) equipped with power supply means (17-18) including battery means (17) and an inverter (18), and environmental control means (19-21) including air conditioning (19) and particle filtration means;
   a second, expandable, environmentally-controlled computer-receiving portion (B), having a double floor (4), and operatively coupled to said first portion; and
   means (2) for rolling said first and second portions from place to place.

2. The clean room of claim 1, wherein said second portion enlarges telescopically.

3. The clean room of claim 1, wherein said second portion enlarges by means of folding panels.

* * * * *